(12) United States Patent
Van Bommel et al.

(10) Patent No.: US 9,157,583 B2
(45) Date of Patent: Oct. 13, 2015

(54) LIGHTING DEVICE COMPRISING AT LEAST TWO ORGANIC LUMINESCENT MATERIALS

(71) Applicant: KONINKLIJKE PHILIPS N.V., Eindhoven (NL)

(72) Inventors: Ties Van Bommel, Horst (NL); Rifat Ata Mustafa Hikmet, Eindhoven (NL); René Theodorus Wegh, Veldhoven (NL); Martinus Petrus Joseph Peeters, Weert (NL); Gerardus Wilhelmus Gerbe Van Dreumel, Nijmegen (NL); Lars Christian Casper, Den Bosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/388,937

(22) PCT Filed: Mar. 22, 2013

(86) PCT No.: PCT/IB2013/052277
§ 371 (c)(1),
(2) Date: Sep. 29, 2014

(87) PCT Pub. No.: WO2013/144795
PCT Pub. Date: Oct. 3, 2013

(65) Prior Publication Data
US 2015/0054401 A1  Feb. 26, 2015

(30) Foreign Application Priority Data
Mar. 29, 2012 (EP) .................... 12161965

(51) Int. Cl.
*H05B 33/00* (2006.01)
*F21K 99/00* (2010.01)
*H05B 33/14* (2006.01)
*C09K 11/06* (2006.01)
*F21V 9/16* (2006.01)
*F21Y 101/02* (2006.01)

(52) U.S. Cl.
CPC . *F21K 9/56* (2013.01); *C09K 11/06* (2013.01); *H05B 33/14* (2013.01); *F21V 9/16* (2013.01); *F21Y 2101/02* (2013.01); *F21Y 2101/025* (2013.01)

(58) Field of Classification Search
CPC .......... F21K 9/56; C09K 11/06; H05B 33/14
USPC .................. 313/498, 504, 506, 512
See application file for complete search history.

(56) References Cited

U.S. PATENT DOCUMENTS

2006/0066234 A1* 3/2006 Lu et al. .......... 313/512
2010/0127246 A1  5/2010 Nakayama et al.
(Continued)

FOREIGN PATENT DOCUMENTS

EP  1947911 A1  7/2008
WO  2008130562 A1  10/2008
(Continued)

*Primary Examiner* — Joseph L Williams
(74) *Attorney, Agent, or Firm* — Yuliya Mathis

(57) ABSTRACT

The invention provides a lighting device (100) comprising a light source (10) and luminescent materials (20). The luminescent materials (20) comprise a first organic luminescent material (120) and a second organic luminescent material (220), the light source (10) together with the luminescent materials (20) being configured to generate white lighting device light (101) during operation. The first organic luminescent material (120) degrades with time at a first degradation rate and the second organic luminescent material (220) degrades with time at a second degradation rate, wherein the first degradation rate is larger than the second degradation rate. The first organic luminescent material is configured in a first layer (130, 1020) and the second organic luminescent material is configured in a second layer (140, 1220). The first layer and/or the second layer is further configured to at least partly compensate for the difference in the first degradation rate and the second degradation rate in order to maintain the lighting device light (101) substantially white during operation time of the lighting device (100).

14 Claims, 8 Drawing Sheets

(56) References Cited

U.S. PATENT DOCUMENTS

2010/0141125 A1 6/2010 Otsu et al.
2011/0095278 A1 4/2011 Sugita et al.

FOREIGN PATENT DOCUMENTS

WO 2010106478 A1 9/2010
WO 2010116294 A1 10/2010

* cited by examiner

LIGHTING DEVICE COMPRISING AT LEAST TWO ORGANIC LUMINESCENT MATERIALS

CROSS-REFERENCE TO PRIOR APPLICATIONS

This application is the U.S. National Phase application under 35 U.S.C. §371 of International Application No. PCT/IB13/052277, filed on Mar. 22, 2013, which claims the benefit of European Patent Application No 12161965.4, filed on Mar. 29, 2012. These applications are hereby incorporated by reference herein.

FIELD OF THE INVENTION

The invention relates to a lighting device comprising at least two organic luminescent materials.

BACKGROUND OF THE INVENTION

The use of organic luminescent materials or phosphors is known in the art. WO/2008/130562, for instance, describes a composition comprising at least one organic and/or inorganic phosphor in a physiologically acceptable medium, wherein the phosphor(s) is present in an amount effective to convert electromagnetic radiation of an initial frequency to a different frequency. In one embodiment, the phosphors convert the initial radiation frequency, such as infrared or visible light, to a higher frequency, such as ultraviolet (UV) radiation. In another embodiment, the phosphors convert the initial radiation from a higher frequency, such as UV radiation, to a lower frequency, such as infrared or visible light.

SUMMARY OF THE INVENTION

Organic phosphors and quantum dots (QDs) are currently being considered for remote phosphor applications where blue light emitting diodes (LEDs) are used for pumping green to red emitting phosphors in order to obtain white light. Organic phosphors (herein also indicated as organic luminescent materials) have a large number of advantages as compared to inorganic phosphors. The position and the band width of the luminescence spectrum can be designed with ease to be anywhere in the visible range to obtain high efficacy. However, these phosphors are less stable than conventional inorganic phosphors and degrade in time. In order to obtain white light, it may be necessary to use a combination of red and green/yellow emitting phosphors. However, when one of these organic red and green/yellow emitting phosphors is unstable, the color point of the light from the source moves away from the black body line (black body locus or BBL), as a result of degradation of one or more of the organic phosphors, becoming off-white, which is not desired.

Hence, it is an aspect of the invention to provide an alternative lighting device, based on organic luminescent materials, which preferably further at least partly obviates the above-described drawback, and which, preferably for a substantial time, produces white light having color coordinates close to the BBL. Hence, the color point may shift, but during a substantial part of the life time of the product, the color point follows the BBL. Here, we suggest various strategies for keeping the color point on the blackbody line during the degradation of the organic phosphor(s) so that only a shift in the color temperature is observed without light becoming off-white.

The luminescent materials are selected in such a way, that the color point shift, due to degradation of one or more of the organic luminescent materials, follows for at least part of the life time (of the lighting device) the BBL. The lighting device of the invention comprises at least two organic luminescent materials, of which at least one is radiationally coupled to a light source, and the other one is radiationally coupled to one or more of the light source and the other organic luminescent material(s). Optionally, the lighting device may further comprise one or more additional organic luminescent materials and/or one or more additional inorganic materials, which may independently be radiationally coupled to one or more of the light source and one or more of the other luminescent materials.

The term "radiationally coupled" especially means that the light source and the luminescent material(s) are associated with each other so that at least part of the radiation emitted by the light source is received by the luminescent material(s) (and at least partly converted into luminescence by said luminescent material(s)). Herein, a first luminescent material may also be radationally coupled to a second luminescent material, which indicates that at least part of the emission of the second luminescent material is received by the first luminescent material (and at least partly converted into luminescence of the first luminescent material).

In a first aspect, the invention provides a lighting device comprising a light source and luminescent materials, the luminescent materials comprising a first organic luminescent material and a second organic luminescent material, wherein the light source together with the luminescent materials is configured to generate white lighting device light (i.e. the light of the lighting device is white light) during operation, wherein the first organic luminescent material degrades with time at a first degradation rate, wherein the second organic luminescent material degrades with time at a second degradation rate, wherein the first degradation rate is larger than the second degradation rate, characterized in that the first organic luminescent material is configured in a first layer, that the second organic luminescent material is configured in a second layer, and that the first layer and/or the second layer is further configured to at least partly compensate for the difference in the first degradation rate and the second degradation rate in order to maintain the lighting device light substantially white during operation time of the lighting device.

With such lighting device, the light of the lighting device ("lighting device light") may for a substantial period of time stay white, even when shifting in color point due to degradation of one or more of the (organic) luminescent materials. Especially, the lighting device light maintains to be within 15 SDCM (standard deviation of colour matching) from the BBL (black body locus) during operation time of the lighting device, even more especially within 10 SDCM, yet even more especially within 5 SDCM. In a specific embodiment, the luminescent materials are configured to maintain the lighting device light white (especially within 15 SDCM, even more especially within 10 SDCM, yet even more especially within 5 SDCM from the BBL) during at least 5,000 h operation time of the lighting device, even more especially during at least 20,000 h operation time of the lighting device, yet even more especially during at least 50,000 h operation time of the lighting device. These indicated times especially relate to the operation time of the lighting device calculated from its first use after production (in a plant).

The lighting device can be any type of lighting device. Assuming a LED light source, those lighting device types may for instance include configurations with one or more luminescent materials arranged on a LED die, arranged in a (silicone) resin on a LED die, arranged on a dome on the LED die, and other configurations wherein one or more luminescent materials are remote from the LED die.

Especially, all luminescent materials are arranged remote from the LED die (i.e. not in physical contact with the LED die). The shortest distance between the LED die and one or more of the luminescent materials, preferably all luminescent materials, may be larger than 0 mm, especially equal to or larger than 0.1 mm, such as 0.2 or more, and in some embodiments even equal to or larger than 10 mm, such as 10-100 mm.

As indicated above, the lighting device comprises luminescent materials, which comprise at least two organic luminescent materials. There is a nearly unlimited assortment of such organic luminescent materials or dyes. Relevant examples are perylenes (such as dyes known under their trade name Lumogen from the company BASF, Ludwigshafen, Germany: Lumogen F240 Orange, Lumogen F300 Red Lumogen F305 Red, Lumogen F083 Yellow, Lumogen F170 Yellow, Lumogen F850 Green), Yellow 172 from the company Neelikon Food Dyes & Chemical Ltd., Mumbai, India, India, and dyes such as coumarins (for example Coumarin 6, Coumarin 7, Coumarin 30, Coumarin 153, Basic Yellow 51), napthalimides (for example Solvent Yellow 11, Solvent Yellow 116), Fluorol 7GA, pyridines (for example pyridine 1), pyrromethenes (such as Pyrromethene 546, Pyrromethene 567), uranine, rhodamines (for example Rhodamine 110, Rhodamine B, Rhodamine 6G, Rhodamine 3B, Rhodamine 101, Sulphorhodamine 101, Sulphorhodamine 640, Basic Violet 11, Basic Red 2), cyanines (for example phthalocyanine, DCM), stilbenes (for example Bis-MSB, DPS), available from many traders. Several other dyes, such as acid dyes, basic dyes, direct dyes and dispersion dyes may be used as long as they show a sufficiently high fluorescence quantum yield for the intended use. Organic materials of special interest that may be applied comprise for instance BASF Lumogen 850 for green luminescence, BASF Lumogen F083 or F170 for yellow luminescence, BASF Lumogen F 240 for orange luminescence, and BASF Lumogen F 300 or F305 for red luminescence. Hence, the luminescent materials may comprise for instance at least two of the above-mentioned organic luminescent materials, and optionally one or more further organic luminescent materials, which may also be selected from the above-mentioned organic luminescent materials.

Dependent upon the type of light of the light source (see below), the organic luminescent materials may for instance comprise a combination of green and red emitting materials, or a combination of yellow and red emitting luminescent materials, etc. In case a light source is applied that (predominantly) generates UV light, a combination of blue, green and red emitting materials, or a combination of blue, yellow and red emitting luminescent materials, etc., may be applied. The lighting device is configured to generate white light based on the combination of the light source light and the luminescent materials. The light source light may be either substantially converted (in the case of UV light), or contribute to the lighting device light (in the case of blue light).

The light source can be any light source, but is (thus) especially a light source that is able to substantially emit in the UV or in the blue. Hence, in an embodiment the light source comprises a blue emitting light emitting device. In yet another embodiment, which may be combined with the former embodiment, the light source comprises a UV emitting light emitting device. Hence, the term light source may in especially relate to a LED (light emitting diode). Preferably, the light source is a light source that during operation emits at least light at wavelength selected from the range of 300-480 nm, especially 380-460. This light may partially be used by the light conversion element (see below). In a specific embodiment, the light source comprises a solid state LED light source (such as a LED or laser diode). The term "light source" may also relate to a plurality of light sources, such as 2-20 (solid state) LED light sources. Optionally, the light source is configured to generate white light (and optionally UV light)(see also below), and part of the blue and/or optional UV light is used by one or more of the luminescent materials as excitation light and at least partially converted into luminescence.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10.000K. Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light. This blue component may partially be absorbed by the luminescent material and converted into luminescent material light. Optionally, a separate blue light source (such as a solid state LED) may be included in the light source.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm, especially 620-650 nm. The terms "visible", "visible light" or "visible emission" refer to light having a wavelength in the range of about 380-750 nm.

In addition to the at least two organic luminescent materials, the luminescent materials may also optionally comprise one or more inorganic luminescent materials.

In a further specific embodiment, the luminescent materials comprises one or more further inorganic luminescent materials selected from the group consisting of divalent europium containing nitride luminescent material, a divalent europium containing oxynitride luminescent material, a divalent europium containing sulfide luminescent material, and a divalent europium containing selenide (and sulfide) luminescent material. A red luminescent material may in an embodiment comprise one or more materials selected from the group consisting of $(Ba,Sr,Ca)S:Eu$, $Ca(S,Se):Eu$, $(Ba,Sr,Ca)AlSiN_3:Eu$ and $(Ba,Sr,Ca)_2Si_5N_8:Eu$. In these compounds, europium (Eu) is substantially or only divalent, and replaces one or more of the indicated divalent cations. In general, Eu will not be present in amounts larger than 10% of the cation, especially in the range of about 0.5-10%, more especially in the range of about 0.5-5% relative to the cation(s) it replaces. The term ":Eu" or ":Eu$^{2+}$", indicates that part of the metal ions is replaced by Eu (in these examples by Eu$^{2+}$).

For instance, assuming 2% Eu in CaAlSiN$_3$:Eu, the correct formula could be (Ca$_{0.98}$Eu$_{0.02}$)AlSiN$_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50-100%, especially 50-90% Ba and 50-0%, especially 50-10% Sr, such as Ba$_{1.5}$Sr$_{0.5}$Si$_5$N$_8$:Eu, (i.e. 75% Ba; 25% Sr). Here, Eu is introduced and replaces at least part of M i.e. one or more of Ba, Sr, and Ca). Likewise, the material (Ba,Sr,Ca)AlSiN$_3$:Eu can also be indicated as MAlSiN3:Eu wherein M is one or more elements selected from the group consisting of barium (Ba) strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Preferably, in an embodiment the first luminescent material comprises (Ca,Sr,Ba)AlSiN$_3$:Eu, preferably CaAlSiN$_3$:Eu. Further, in another embodiment, which may be combined with the former, the first luminescent material comprises (Ca,Sr,Ba)$_2$Si$_5$N$_8$:Eu, preferably (Sr,Ba)$_2$Si$_5$N$_8$:Eu. The terms "(Ca,Sr,Ba)" indicate that the corresponding cation may be occupied by calcium, strontium or barium. It also indicates that in such material corresponding cation sites may be occupied with cations selected from the group consisting of calcium, strontium and barium. Thus, the material may for instance comprise calcium and strontium, or only strontium, etc. Similar principles relate to the term "(S,Se)".

Hence, in an embodiment the luminescent material may further comprises M$_2$Si$_5$N$_8$:Eu$^{2+}$, wherein M is selected from the group consisting of Ca, Sr and Ba, even more especially wherein M is selected from the group consisting of Sr and Ba. In yet another embodiment, which may be combined with the former, the luminescent material may further comprise MAlN$_3$:Eu$^{2+}$, wherein M is selected from the group consisting of Ca, Sr and Ba, even more especially wherein M is selected from the group consisting of Sr and Ba.

In a further specific embodiment, the luminescent materials comprises one or more further inorganic luminescent materials, such as selected from the group consisting of a trivalent cerium containing garnet, a trivalent cerium containing oxynitride, and a trivalent cerium containing nitride. Especially, the luminescent material may further comprise a M$_3$A$_5$O$_{12}$:Ce$^{3+}$ luminescent material, wherein M is selected from the group consisting of Sc, Y, Tb, Gd, and Lu, wherein A is selected from the group consisting of Al and Ga. Preferably, M at least comprises one or more of Y and Lu, and wherein A at least comprises Al. These types of materials may give highest efficiencies. In a specific embodiment, the second luminescent material comprises at least two luminescent materials of the type of M$_3$A$_5$O$_{12}$:Ce$^{3+}$, wherein M is selected from the group consisting of Y and Lu, wherein A is selected from the group consisting of Al, and wherein the ratio Y:Lu differ for the at least two luminescent materials. For instance, one of them may be purely based on Y, such as Y$_3$Al$_5$O$_{12}$:Ce$^{3+}$, and one of them may be a Y,Lu based system, such as (Y$_{0.5}$Lu$_{0.5}$)$_3$Al$_5$O$_{12}$:Ce$^{3+}$. Embodiments of garnets especially include M$_3$A$_5$O$_{12}$ garnets, wherein M comprises at least yttrium or lutetium and wherein A comprises at least aluminium. Such garnet may be doped with cerium (Ce), with praseodymium (Pr) or a combination of cerium and praseodymium; especially however with Ce. Especially, A comprises aluminium (Al), however, A may also partly comprise gallium (Ga) and/or scandium (Sc) and/or indium (In), especially up to about 20% of Al, more especially up to about 10% of Al (i.e. the A ions essentially consist of 90 or more mole % of Al and 10 or less mole % of one or more of Ga, Sc and In); A may especially comprise up to about 10% gallium. In another variant, A and O may at least partly be replaced by Si and N. The element M may especially be selected from the group consisting of yttrium (Y), gadolinium (Gd), terbium (Tb) and lutetium (Lu). Further, Gd and/or Tb are especially only present up to an amount of about 20% of M. In a specific embodiment, the garnet luminescent material comprises (Y$_{1-x}$Lu$_x$)$_3$B$_5$O$_{12}$:Ce, wherein x is equal to or larger than 0 and equal to or smaller than 1. The term ":Ce" or ":Ce$^{3+}$", indicates that part of the metal ions (i.e. in the garnets: part of the "M" ions) in the luminescent material is replaced by Ce. For instance, assuming (Y$_{1-x}$Lu$_x$)$_3$Al$_5$O$_{12}$:Ce, part of Y and/or Lu is replaced by Ce. This notation is known to the person skilled in the art. Ce will replace M in general for not more than 10%; in general, the Ce concentration will be in the range of 0.1-4%, especially 0.1-2% (relative to M). Assuming 1% Ce and 10% Y, the full correct formula could be (Y$_{0.1}$Lu$_{0.89}$Ce$_{0.01}$)$_3$Al$_5$O$_{12}$. Ce in garnets is substantially or only in the trivalent state, as known to the person skilled in the art.

As indicated above, organic luminescent materials may degrade with time. In general, these organic luminescent materials degrade much faster than inorganic luminescent materials. Substantially all organic luminescent materials mentioned above degrade faster (in unprotected condition) than substantially all inorganic luminescent materials mentioned above. This degradation of organic luminescent materials may be due to a reaction with other materials, such as oxygen and/or water, and/or may be due (or enhanced) by radiation (especially from the light source, but also daylight may have impact on the lifetime). Hence, degradation may also be due to radiation (of the light source and/or of light from other luminescent materials). Due to degradation, the color point may shift. An advantage of many organic luminescent materials is that degradation occurs via a process called "bleaching", i.e. the degradation of the organic luminescent material does not lead to absorption of light by the degraded product, but the organic luminescent material is "bleached away".

The first and/or the second organic luminescent materials, including the additional optional organic luminescent material(s) and optional inorganic luminescent material(s), may be embedded in a transmissive material, such as a transmissive film or plate, in order to protect them against the influence of oxygen and/or water, i.e. to decrease the degradation rate of the organic phosphor. Especially, transmissive organic materials may be applied, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethyleneterephthalate (PET), (PETG)

(glycol modified polyethyleneterephthalate), PDMS (polydimethylsiloxane), and COC (cyclo olefin copolymer).

The two or more organic luminescent materials may be selected such that the combined color shifts as a result of degradation may lead to a shift of the color point of the lighting device light along the BBL. With only a blue LED and a yellow organic luminescent material, this is substantially not possible, whereas when using one or more additional organic luminescent material, the shift in color point of one more organic luminescent materials may compensate the shift of one or more other organic luminescent materials in such a way, that the color point of the lighting device light stays (at least temporarily) close to the BBL, even when shifting. The proper choice of luminescent materials will result in a color point change along the BBL. Hence, in an embodiment, the two or more organic luminescent materials may be selected in such a way, that the resulting color point shift of the light generated by the lighting device (as a result of degradation of one or more of the organic luminescent materials) may follow (for a substantial part of the life time of the lighting device) the BBL.

A problem is that when different organic luminescent materials applied, the degradation times or rates in general also differ. However, this behaviour may also be used to define systems which together may prevent, reduce or limit, at least temporarily, the color point shift away from the BBL.

In a specific embodiment, the first layer comprises a first host material in which the first organic luminescent material is embedded, and wherein the second layer comprises a second host material in which the second organic luminescent material is embedded. In this way, the degradation characteristics of the host materials may be used to balance the difference of the degradation rates of the first and second organic luminescent materials. With selecting the type of organic luminescent material and host material, the degradation rate of the first organic luminescent material may be influenced in such a way to arrive at a color point shift (of the lighting device light) with time which is along the BBL (or follows the BBL).

Alternatively or additionally, the first organic luminescent material is embedded in a first host material, the second organic luminescent material is embedded in a second host material, and the first host material is enclosed by an oxygen barrier. Alternatively, the first layer is enclosed by an oxygen barrier. Such oxygen barrier may reduce the degradation rate of the first organic luminescent material. Of course both host materials may be enclosed by oxygen barriers, but especially the host material containing the faster degrading organic luminescent material has a better oxygen barrier than the host material containing the slower degrading organic luminescent material. However, alternatively, the host material containing the slower degrading luminescent organic material may be enclosed by the oxygen barrier, as this, dependent upon the color point and color point shift, may also lead to the desired properties. The term oxygen barrier may for instance refer to a coating. The host material may be provided with different types of oxygen barriers, for instance arranged next to each other or as stack.

Alternatively or additionally, the first organic luminescent material is configured to be exposed to a lower light source light intensity than the second organic luminescent material. For instance, this may easily obtained by arranging the first organic luminescent material more remote from the light source(s) than the second organic luminescent material (and/or may be obtained by arranging the first organic luminescent material downstream of the second organic luminescent materials. Alternatively, the first organic luminescent materials is only partially excited by light generated by the second organic luminescent material, during operation of the lighting device.

In yet other embodiments, which may also be combined with other embodiments, such as the above described embodiments, use is made of the fact that degradation of organic materials includes bleaching and quantum efficiencies are in general very high (>0.90, especially >0.95, even more especially >0.98). In a particular embodiment, the first layer has a first layer thickness between an upstream face and a downstream face of the first layer, the second layer has a second layer thickness between an upstream face and a downstream face of the second layer, the first layer thickness being larger than the second layer thickness. Hence, a layer (of a layer comprising the organic luminescent material) may be created which has such thickness that all light of a specific wavelength range is absorbed by the (organic luminescent material in the) layer before reaching the end of the layer. When degrading, the absorption zone shifts through the material and in this way, the resulting color point shift of the light generated by the lighting device (as a result of degradation of one or more of the organic luminescent materials) may follow (for a substantial part of the life time of the lighting device) the BBL.

Hence, in an embodiment, the first layer has a first layer thickness between an upstream face and a downstream face of the first layer, wherein the first organic luminescent material in said first layer is excitable by excitation light selected from the group consisting of light source light and light generated by the second organic luminescent material, wherein during operation of the lighting device the excitation light is travelling in a direction from the upstream face to the downstream face (of said first layer), and wherein the first layer thickness is selected to impose that for at least part of the wavelength range of the excitation light all light of said wavelength range part is absorbed by the first organic luminescent material before reaching the downstream face. Optionally this may apply to the entire wavelength range of the excitation light, i.e. all excitation light (over the whole spectral range of the excitation light) is absorbed.

Alternatively or additionally, the second layer has a second layer thickness between an upstream face and a downstream face of the second layer, wherein the second organic luminescent material in said second layer is excitable by excitation light selected from the group consisting of light source light and light generated by the first organic luminescent material, wherein during operation of the lighting device the excitation light is travelling in a direction from the upstream face to the downstream face (of said second layer), and wherein the second layer thickness is selected to impose that for at least part of the wavelength range of the excitation light only part of the light of said wavelength range part is absorbed by the second organic luminescent material when reaching the downstream face. In this latter embodiment, part of the excitation light may escape from the downstream face (unabsorbed). Here, part may refer to spectral parts of the excitation wavelength range and/or at specific wavelengths only part of the light is absorbed.

Above, it is indicated that the layer thickness may be selected to impose that for at least part of the wavelength range of the excitation light only part/all of the light of said wavelength range part is absorbed by the one or more slower/faster degrading (organic) luminescent materials when reaching the downstream face (respectively). In case (organic) luminescent material is embedded in a host material, the layer thickness required may depend upon the concentration of the (organic) luminescent material. Hence, in an embodiment, the first organic luminescent material is configured in a first layer having a first layer thickness between an upstream face and a downstream face of the first layer, wherein the first organic luminescent material in said first layer is excitable by excitation light selected from the group consisting of light source light and light generated by one or more of the other luminescent materials, wherein during operation of the lighting device the excitation light is travelling in a direction from the upstream face to the downstream face (of said first layer), and wherein the concentration of the first organic luminescent material (in said layer) is selected to impose that for at least part of the wavelength range of the excitation light all light of said wavelength range part is absorbed by the first organic luminescent materials before reaching the downstream face. In another embodiment, the first organic luminescent material is configured in the first layer at a first concentration, and wherein the second organic luminescent material is configured in the second layer at a second concentration, the first concentration being higher than the second concentration.

Alternatively or additionally, preferably one or more slower degrading organic luminescent materials are configured in a second layer having a second layer thickness between an upstream face and a downstream face of the second layer, wherein those one or more slower degrading organic luminescent materials in said second layer are excitable by excitation light selected from the group consisting of light source light and light generated by one or more of the other luminescent materials, wherein during operation of the lighting device the excitation light is travelling in a direction from the upstream face to the downstream face (of said second layer), and wherein the concentration of the slower degrading organic luminescent material (in said layer) is selected to impose that for at least part of the wavelength range of the excitation light only part of the light of said wavelength range part is absorbed by the one or more slower degrading organic luminescent materials when reaching the downstream face.

The terms "upstream" and "downstream" relate to an arrangement of items or features relative to the propagation of the light from a light generating means (here especially the light source), wherein relative to a first position within a beam of light from the light generating means, a second position in the beam of light closer to the light generating means is "upstream", and a third position within the beam of light further away from the light generating means is "downstream". Note that in these embodiments, it is also included that optionally one or more of the organic luminescent is additionally or even alternatively excited by light of one or more other luminescent materials (organic or optionally inorganic).

The option that a luminescent material is excited by another luminescent materials may also be (further) used to obtained the desired color point shift, as the degradation rate of a faster degrading organic luminescent material may be used to "impose" this rate on a slower degrading (organic) luminescent material when such slower degrading organic luminescent materials can be excited by emission light of the faster degrading organic luminescent material. Hence, when the one or more slower degrading organic luminescent material are radiationally coupled to one or more faster degrading organic luminescent materials that have the ability to excite the one or more slower degrading luminescent materials, a desired color point shift along the BBL may be obtained. Hence, the invention also provides an embodiment wherein one or more faster degrading organic luminescent materials are configured to be at least partially excited by light generated by the one or more slower degrading organic luminescent materials during operation of the lighting device. In an embodiment, the slower degrading organic luminescent material is arranged downstream of the faster degrading organic luminescent material.

As can be concluded from the above, it may be beneficial to use even more than two organic luminescent materials to control the color point shift. Hence, in an embodiment the lighting device comprises at least three organic luminescent materials.

However, also inorganic luminescent materials, such as mentioned above, may be applied to tune the resulting color point shift. In an embodiment, the luminescent materials further comprise an inorganic luminescent material and the first organic luminescent material emits during operation in a first predetermined wavelength range, wherein the inorganic luminescent material is configured to degrade slower than the first organic luminescent material, and wherein the inorganic luminescent material emits during operation in a second predetermined wavelength range which at least partially overlaps with the first predetermined wavelength range. In fact, the degradation rate of a specific color is reduced due to dilution of the contribution of the organic luminescent material by the inorganic luminescent material emitting in the same wavelength range. For instance, a red organic luminescent material may be combined with an inorganic red luminescent material. As indicated above, the degradation rate of the above indicated inorganic luminescent materials can be neglected compared to the degradation rate of the above indicated organic luminescent materials.

For quantum dots or quantum dot materials (QD), similar degradation problems may apply. Hence, the invention further provides in an aspect lighting device comprising a light source and luminescent materials, the luminescent materials comprising (i) one or more of a first organic luminescent material and a first QD ("first luminescent materials"), (ii) one or more of a second organic luminescent material and a second QD ("second luminescent material"), optionally one or more of (iii) one or more further organic luminescent materials and one or more of further QDs ("one or more third luminescent materials), and optionally (iv) one or more further inorganic luminescent materials ("one or more fourth luminescent materials"), wherein the light source together with the luminescent materials are configured to generate white lighting device light during operation, wherein the first luminescent material (thus optionally including QDs) degrades with time, wherein the second luminescent material (thus optionally including QDs) degrades with time, and wherein the optional one or more third luminescent materials degrade with time, and wherein the luminescent materials are configured to maintain the lighting device light white during operation time of the lighting device.

The invention has been described above and is described below with reference to organic luminescent materials. However, in further embodiments, the term "organic luminescent material" may be replaced by "quantum dots" or "quantum dot material", or alternatively, the term "organic luminescent material" may be replaced by "quantum dots and/or organic luminescent material" or "quantum dot material and/or organic luminescent material". Herein, quantum dots refer to luminescent quantum dots, i.e. those that can be excited by UV and/or blue light, and emit at least somewhere in the visible wavelength range of the spectrum.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

These drawings are not necessarily on scale.

Figure 4A:
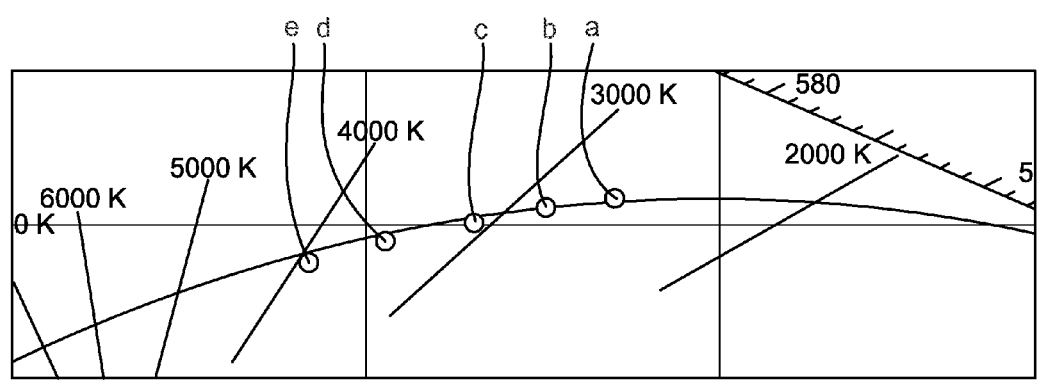
Figure 4B:
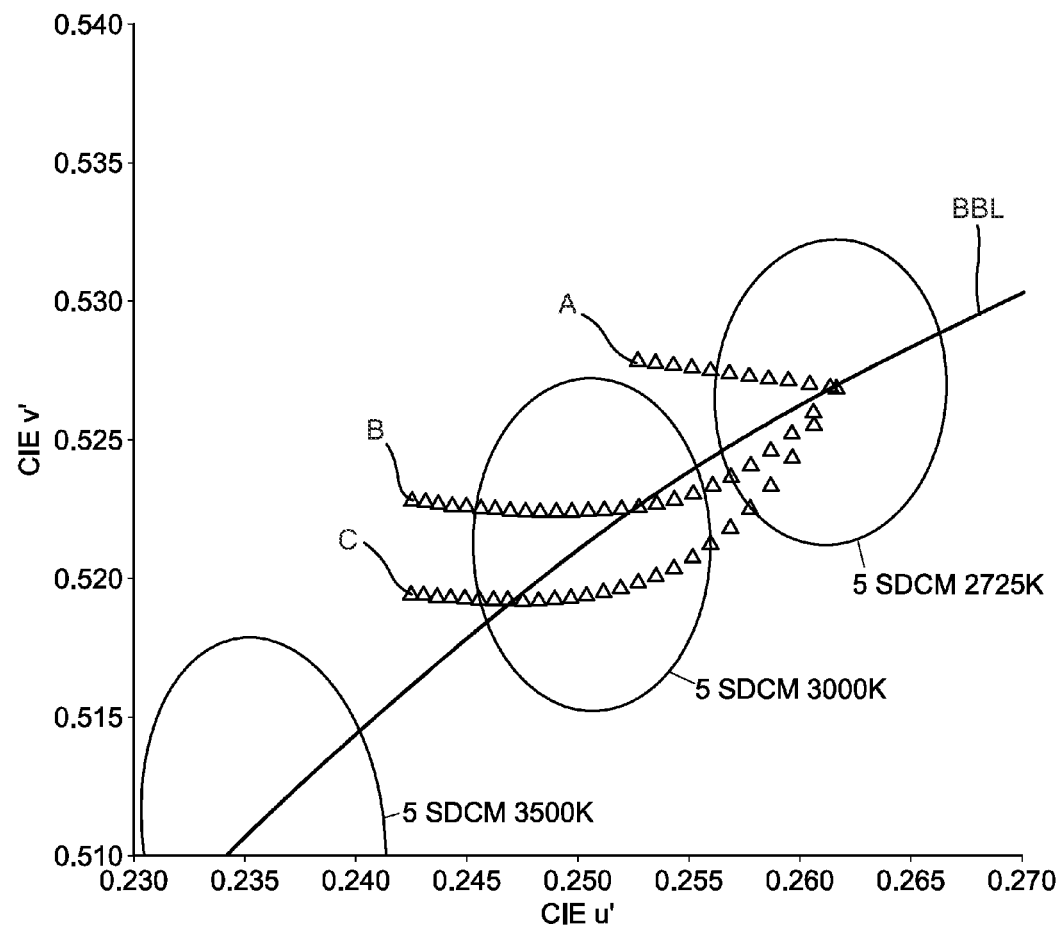

FIGS. 4a-4b depict experimental support.

Figure 5A:
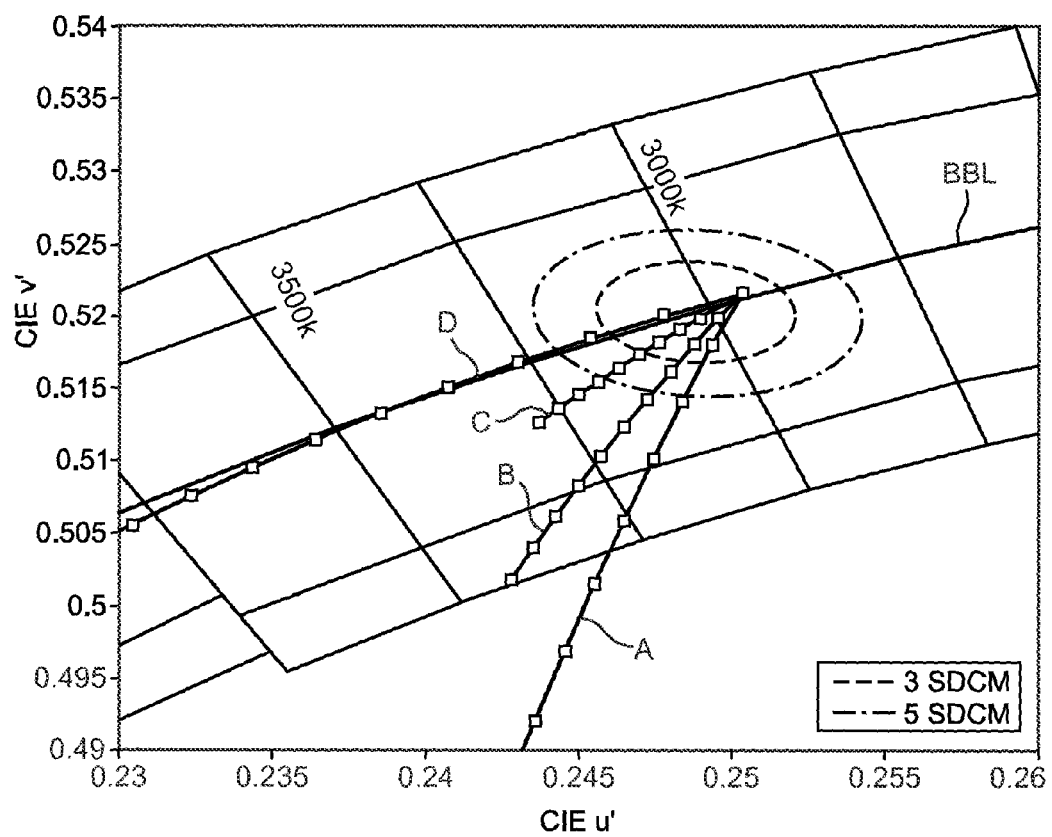
Figure 5B:
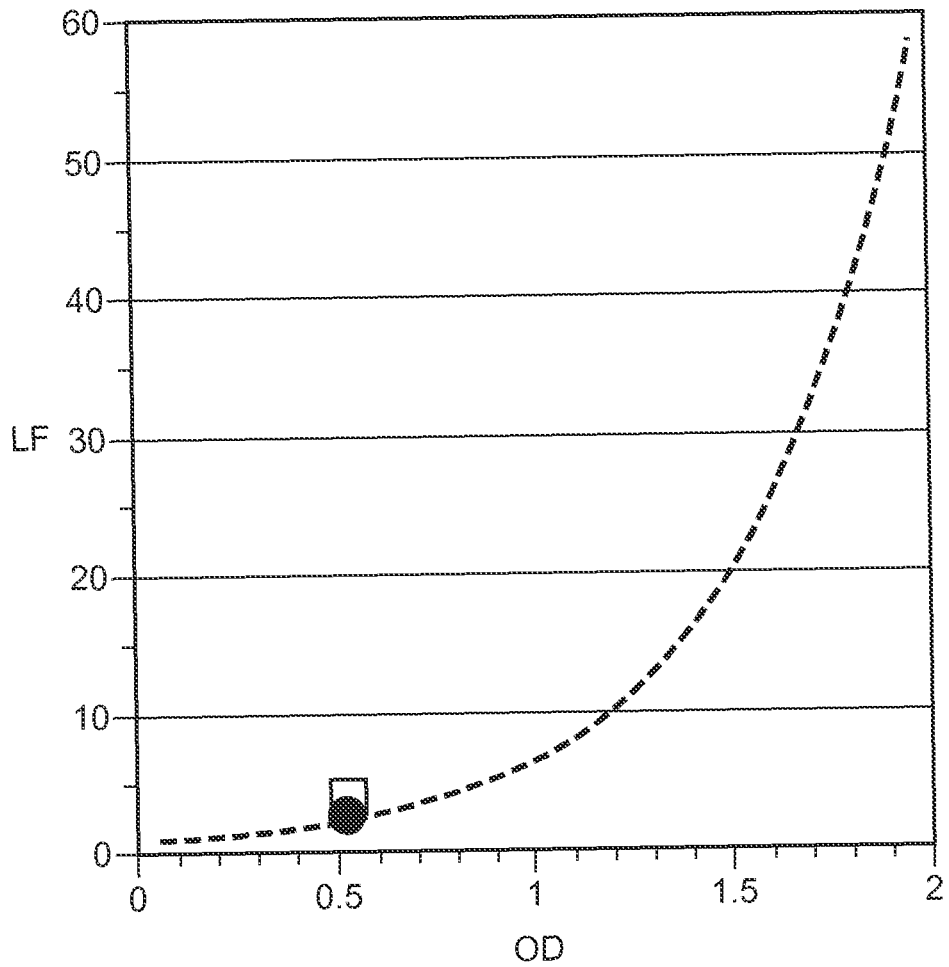

FIGS. 5a-5b depict further experimental support.

DETAILED DESCRIPTION OF THE EMBODIMENTS

Figure 1:
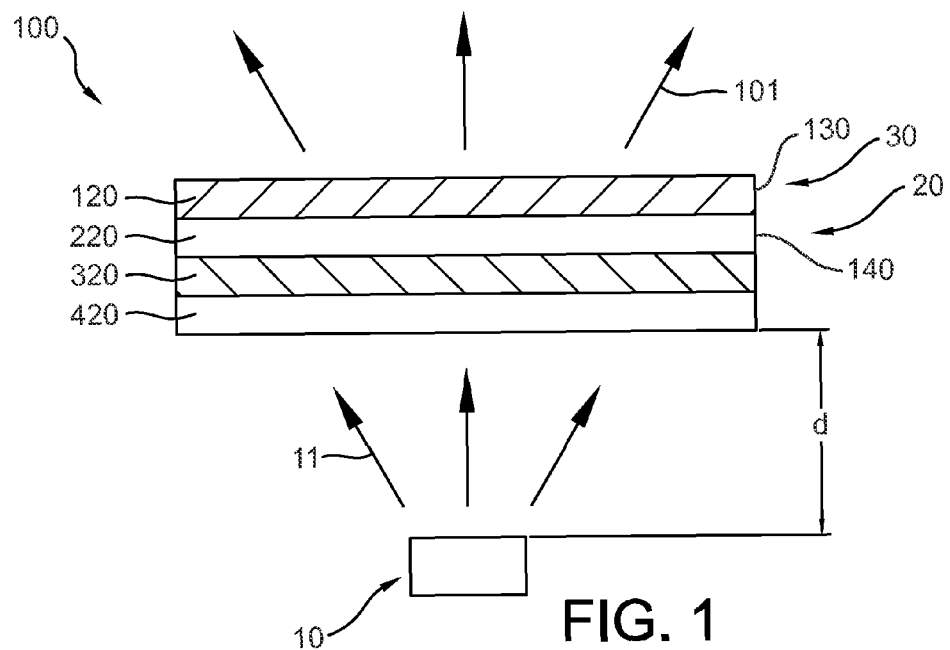
FIG. 1 schematically depicts an embodiment of the lighting device of the invention.

FIG. 1 schematically depicts a lighting device 100 comprising a light source 10 and luminescent materials 20. The light source 10 may for instance be a blue emitting LED, and is configured to generate light 11 during operation of the lighting device 100. This light 11 is used as excitation light by one or more of the luminescent materials 20, as one or more of them are radiationally coupled to the light source 10. The luminescent materials 20 comprise a first organic luminescent material 120 configured in a layer 130, and a second organic luminescent material 220 configured in a layer 140. In an alternative embodiment, the first and the second organic luminescent material are mixed in a single layer. Further, these layers 130, 140 are schematically shown as transparent layers, but alternatively or additionally, these layers may also be non-transmissive, and another exit window is applied (to allow lighting device light escape from the lighting device). Here the layers 130, 140 may be comprised in a converter 30, which also has—in this embodiment—the function of an exit window. Hence, the luminescent materials 20 may be mixed, may be embedded, may be layered, may be layered and embedded, may be arranged at different positions within the lighting device, may be remote or non-remote from the light source 10, etc. etc. FIG. 1 is just a very schematic drawing to show some relevant (and optional) elements. Optionally, the lighting device 100 may comprise one or more further organic luminescent materials 320, and/or optionally one or more further inorganic luminescent materials 420. Also these are schematically depicted as layers, but these luminescent materials may be mixed or may be arranged elsewhere within the lighting device 100. The light source 10 together with the luminescent materials 20 are configured to generate white lighting device light 101 during operation (of the lighting device). As indicated above, the first organic luminescent material and the second organic luminescent material degrade with time; likewise the optional one or more further organic luminescent materials 320 degrade with time. The distance between the luminescent materials 20 is indicated with reference d, which is here the shortest distance to the closest luminescent material 420. The further the luminescent materials 120,220,320,420 are arranged from the light source 10, the larger d will be. Here, d is largest for the first organic luminescent material 120.

Figure 2A:
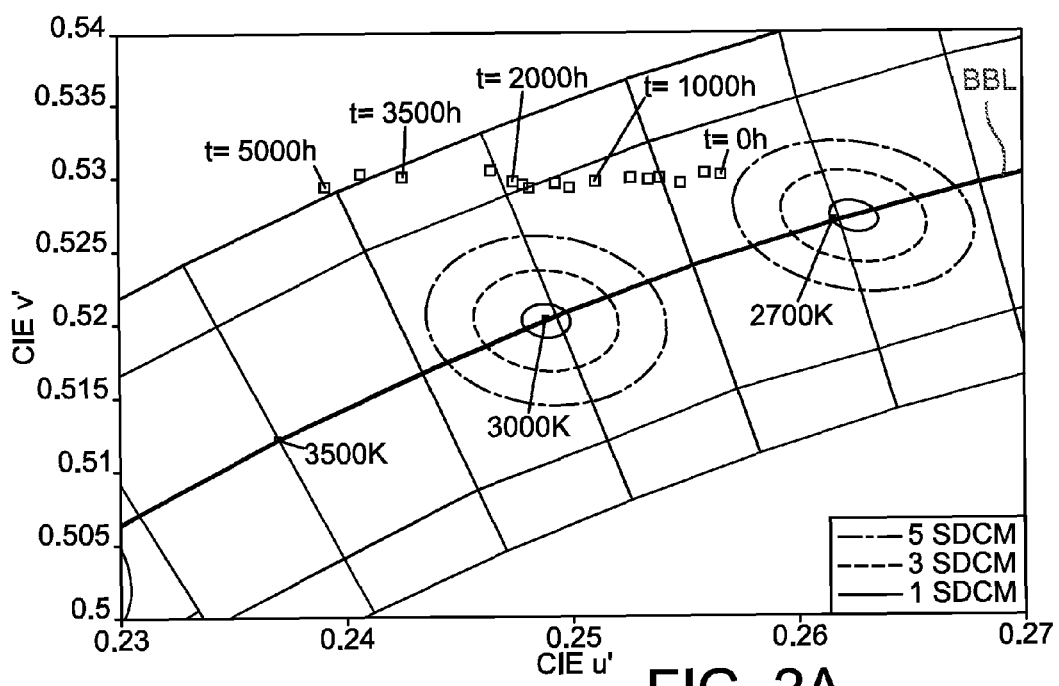
FIGS. 2a-2d schematically depicts some aspects related to the invention.
Figure 2B:
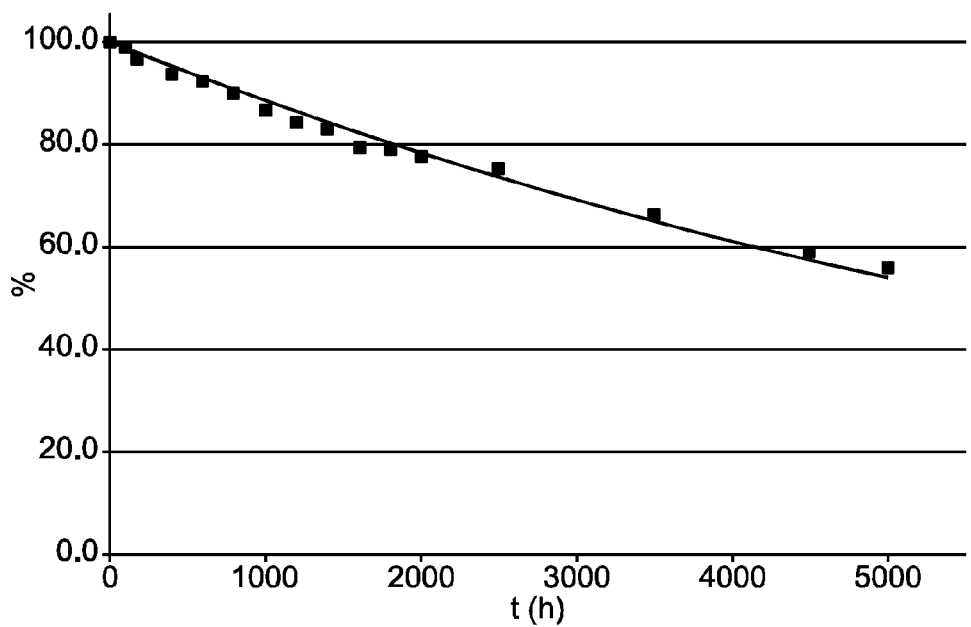

FIG. 2a shows the change of the color point of a combination of an organic luminescent material F305 (red) and YAG: Ce (yellow) (embedded in PMMA) as function of the time. It can be derived from this graph that only the red luminescent material (organic) degrades, whereas within this time frame the yellow luminescent material does not degrade (with a measurable amount). FIG. 2b shows the decrease in absorption intensity with time. A substantial decrease is found. From these graphs it is clear that the application of organic luminescent materials is not straightforward and does not lead to a useful lighting product, unless the claimed technology is applied.

Figure 2C:
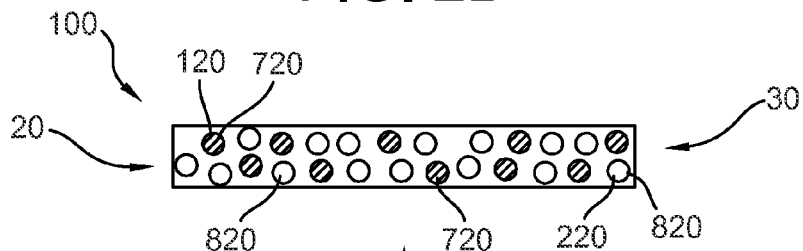
Figure 2D:
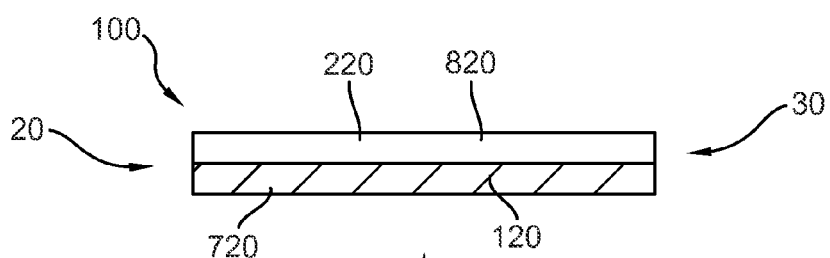

FIG. 2c-2d schematically depict situations wherein one luminescent material degrades faster than another. The luminescent materials 20 comprise one or more faster degrading organic luminescent materials 720 and one or more slower degrading organic luminescent materials 820. The one or more faster degrading organic luminescent materials 720 degrade faster than the one or more slower degrading organic luminescent materials 820. By way of example, FIG. 2c shows embedded luminescent materials and FIG. 2d shows a layered configuration. The faster degrading luminescent material is in these drawings shown dashed. Just for the sake of understanding, the first organic luminescent material 120 is indicated as faster degrading luminescent material 720, and the second organic luminescent material 220 is indicated as slower degrading luminescent 820. However, this may also be the other way around. Further, also more than two organic luminescent materials may be present. Hence, FIGS. 2c-2d are just a guide for understanding some embodiments described below.

FIGS. 3a-3g schematically depict some embodiments of the invention, and some further aspects related to the invention. FIGS. 2c-2d and 3a-3g schematically depict embodiments of the lighting device 100 wherein the luminescent materials 20 comprise one or more faster degrading organic luminescent materials 720 (e.g. a first organic luminescent material 120) and one or more slower degrading organic luminescent materials 820 (e.g. a second organic luminescent material 220), wherein the one or more faster degrading organic luminescent materials 720 degrade faster than the one or more slower degrading organic luminescent materials 820.

Figure 3A:
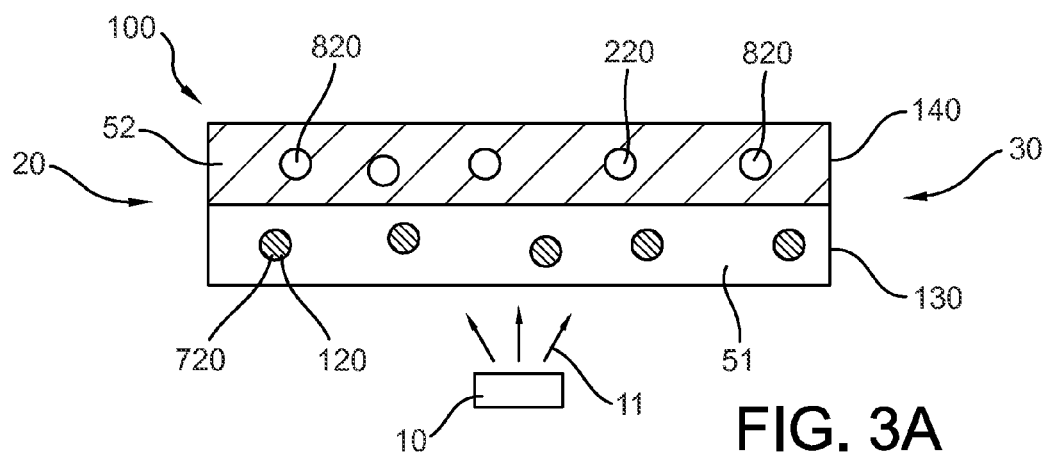
FIGS. 3a-3g schematically depict some embodiments of the invention, and some further aspects related to the invention.

FIG. 3a schematically depicts an embodiment of the lighting device 100 wherein the luminescent materials 20 comprise a first organic luminescent material 120 configured in a first layer 130, and a second organic luminescent material 220 configured in a second layer 140. The first organic luminescent material 120 is embedded in a first host material 51. The second organic luminescent material 220 is embedded in a second host material 52. The first organic luminescent material 120 has, in unprotected condition, a higher degradation rate compared to the second organic luminescent material 22, and to at least partly compensate for this differences in degradation rate, the first and second organic luminescent materials 120, 220 are embedded in the first host material 51 and the second host material 52, respectively. In this way, the faster degrading organic luminescent material 720 is embedded in the first host material 51 and the slower degrading organic luminescent material 820 is embedded in the second host material 52. The first host material 51 decreases the degradation rate of the first organic material 120 by decreasing the amount of oxygen and/or water to which the first organic luminescent material 120 is exposed. In an embodiment, the host materials 51 and 52 chemically differ to compensate for the differences in the degradation rate of the first organic luminescent material 120 and the second organic luminescent material 220.

Figure 3B:
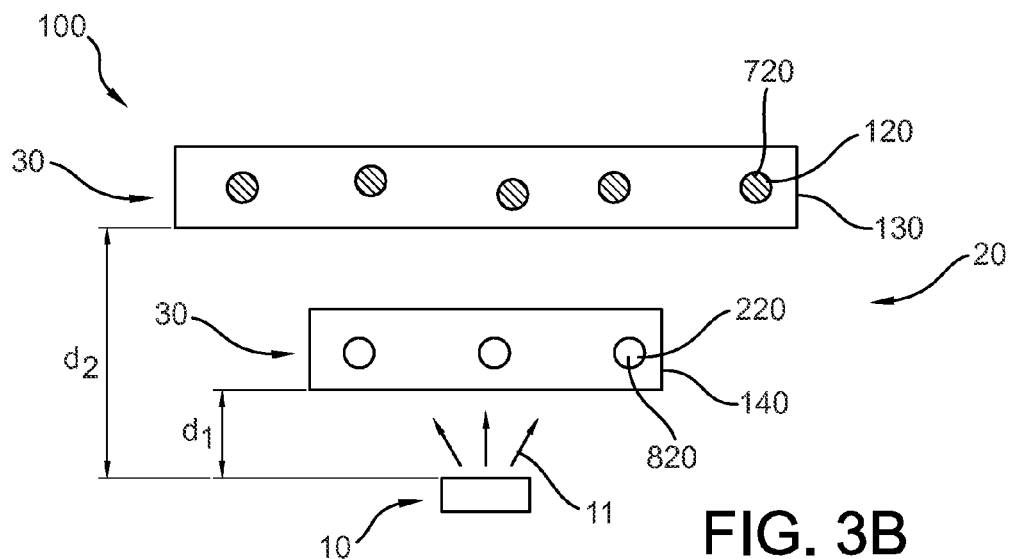

FIG. 3b schematically depicts an embodiment wherein one or more faster degrading organic luminescent materials 720, for example the first organic luminescent material 120, are configured to be exposed to a lower light source light intensity than one or more slower degrading organic luminescent materials 820, for example the second organic luminescent material 220. This is done by placing the faster degrading luminescent material 720 in a layer 130 at a distance d2 from the light source and the slower degrading organic luminescent material 820 in a layer 140 at a distance d1 from the light source, with d1<d2, and/or by arranging the faster degrading organic luminescent material 720 downstream from the slower degrading organic luminescent material 820. Herein, in this schematic drawing, both options are applied together. Optionally, the position of the luminescent materials may be interchanged.

Figure 3C:
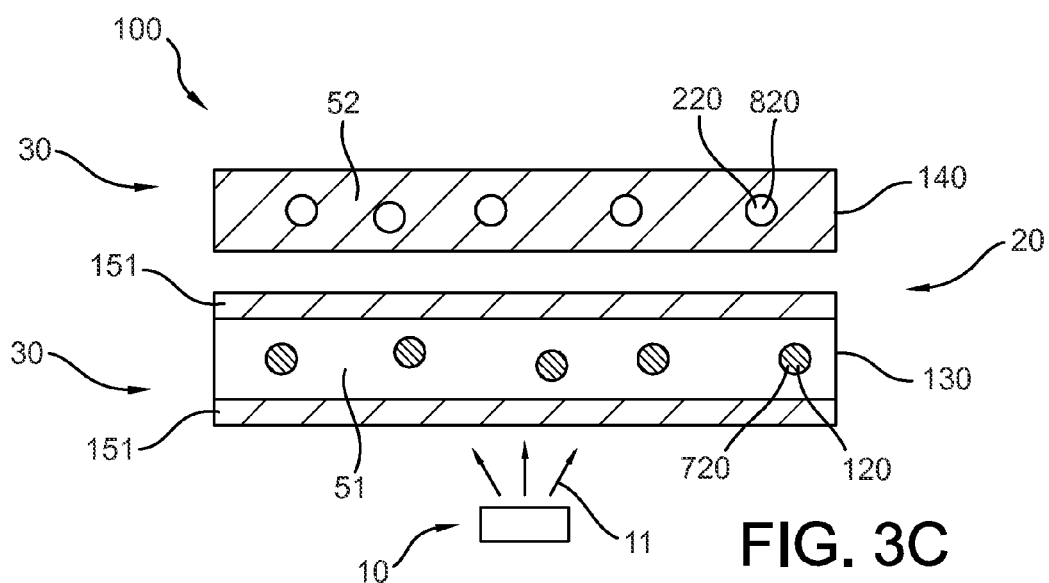

FIG. 3c schematically depicts an embodiment, wherein one or more of the luminescent materials 20 are embedded in such first host material 51 configured in a layer 130, one or more of the luminescent materials 20 are embedded in such second host material 52, configured in a layer 140, and wherein the first host material 51 or the layer 130 is enclosed by an oxygen barrier 151. This may reduce the overall degradation rate of the relatively faster degrading first organic luminescent material 120 in the first host material. However, dependent upon the shift of the color point, the arrangement may also be different. Hence, in a further embodiment (not depicted), wherein one or more of the luminescent materials 20 are embedded in such second host material 52, one or more of the luminescent materials 20 are embedded in such first host material 51, and wherein the second host material 52 is enclosed by an oxygen barrier.

Figure 3D:
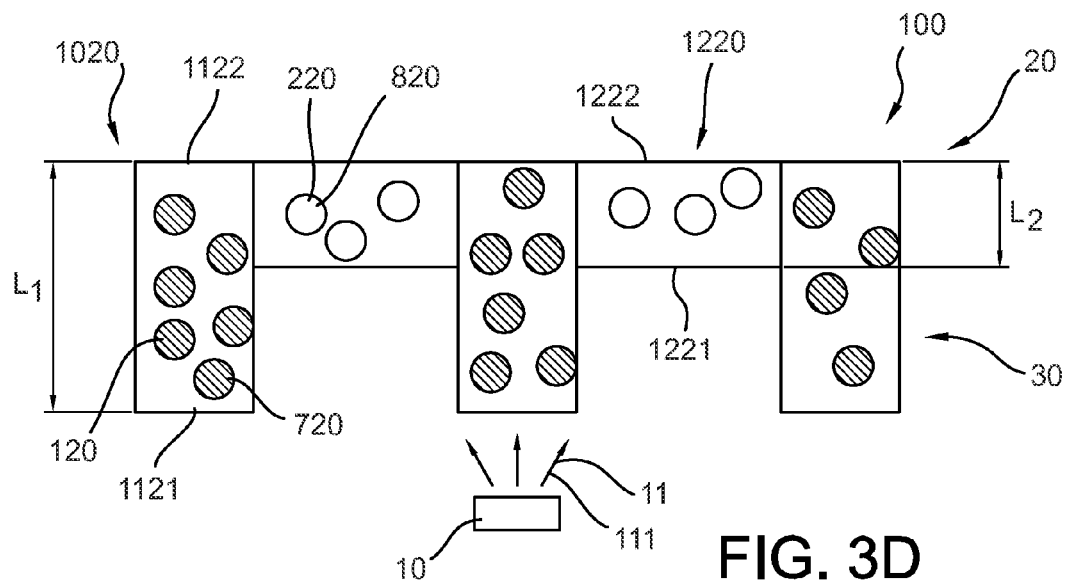

FIG. 3d schematically depicts an embodiment wherein one or more faster degrading organic luminescent materials 720 are configured in a first layer 1020 having a first layer thickness L1 between an upstream face 1121 and a downstream face 1122 of the first layer 1020 and wherein those one or more faster degrading organic luminescent materials in said first layer 1020 are excitable by excitation light 111 selected from the group consisting of light source light and light generated by one or more of the other luminescent materials 20. During operation of the lighting device 100 the excitation light 111 is travelling in a direction from the upstream face 1121 to the downstream face 1122. The first layer thickness L1 (and if applicable the concentration) is selected to impose that for at least part of the wavelength range of the excitation light all light of said wavelength range part is absorbed by the one or more faster degrading organic luminescent materials 720 before reaching the downstream face 1122.

Further, this schematic drawing also depicts one or more slower degrading organic luminescent materials 820 configured in a second layer 1220 having a second layer thickness L2 between an upstream face 1221 and a downstream face 1222 of the second layer 1220, wherein those one or more slower degrading organic luminescent materials in said second layer 1220 are excitable by excitation light 111 selected from the group consisting of light source light and light generated by one or more of the other luminescent materials 20. During operation of the lighting device 100 the excitation light is travelling 111 in a direction from the upstream face 1221 to the downstream face 1222. The second layer thickness L2 (and if applicable the concentration) is selected to impose that for at least part of the wavelength range of the excitation light only part of the light of said wavelength range part is absorbed by the one or more slower degrading organic luminescent materials 820 when reaching the downstream face 1222.

Figure 3E:
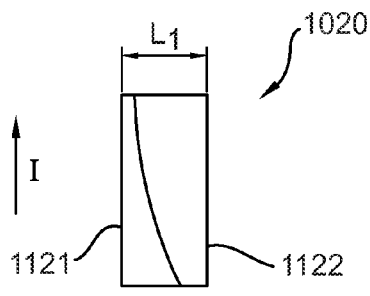

Hence, within the first layer full conversion of the excitation light by the faster degrading organic luminescent material 720 takes place. However, within the second layer, only partial conversion of the excitation light by the slower degrading organic luminescent material 820 takes place. With time, bleaching may occur, by which excitation light may penetrated deeper in the first layer. This is shown in FIG. 3e, wherein the rectangular schematically depicts the layer, but on the y-axis also the intensity of the excitation light as function as the depth x (x-axis) into the layer is depicted. Before reaching the downstream face 1122, all excitation light has been absorbed. With time, the front where no excitation light is found shifts to the downstream face. In this way, a delayed influence of the degradation on the may be obtained, and thus also a delayed color point shift.

The same effects may be obtained by alternatively or additionally increase or decrease the concentration of the luminescent material, as with larger concentration, the absorption is higher and the path length of the excitation light in the layer may decrease and with smaller concentration the absorption is lower and the path length of the excitation light in the layer may increase.

Figure 3F:
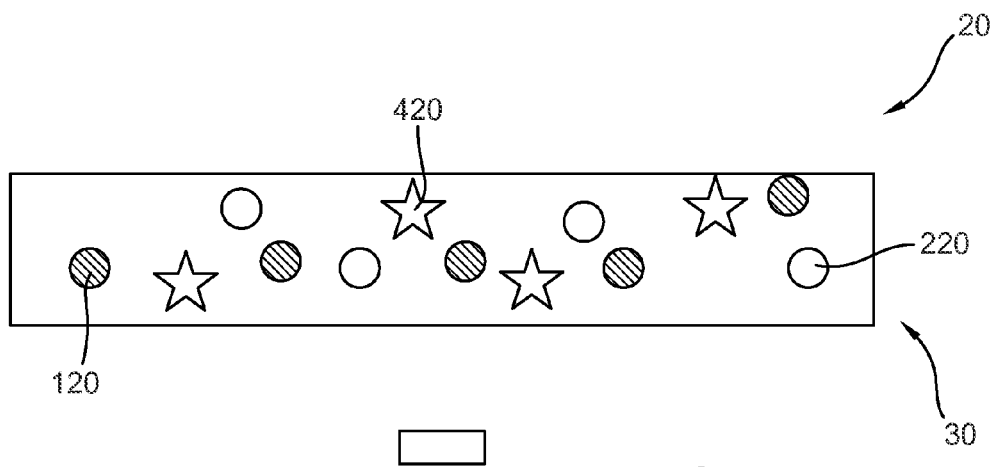

FIG. 3f schematically depicts an embodiment, wherein also one or more inorganic luminescent materials 420 are applied. One or more of them are configured to emit in at least part of the emission wavelength range of the first or the second luminescent material 120,200, especially in at least part of the emission wavelength range of the organic luminescent material that degrades fastest. Hence, in FIG. 3*f* one or more of the faster degrading organic luminescent materials 720 emit during operation in a first predetermined wavelength range. The luminescent materials 20 further comprise one or more inorganic luminescent materials 420 configured to degrade slower than the one or more faster degrading organic luminescent materials 720. Said one or more inorganic luminescent materials 420 emit during operation in a second predetermined wavelength range which at least partially overlaps with the first predetermined wavelength range. In this way, the influence of the color point shift of the faster degrading organic luminescent material on the overall color point (shift) is reduced due to the inorganic luminescent material, having an emission having a color point close to the faster degrading organic luminescent material.

Figure 3G:
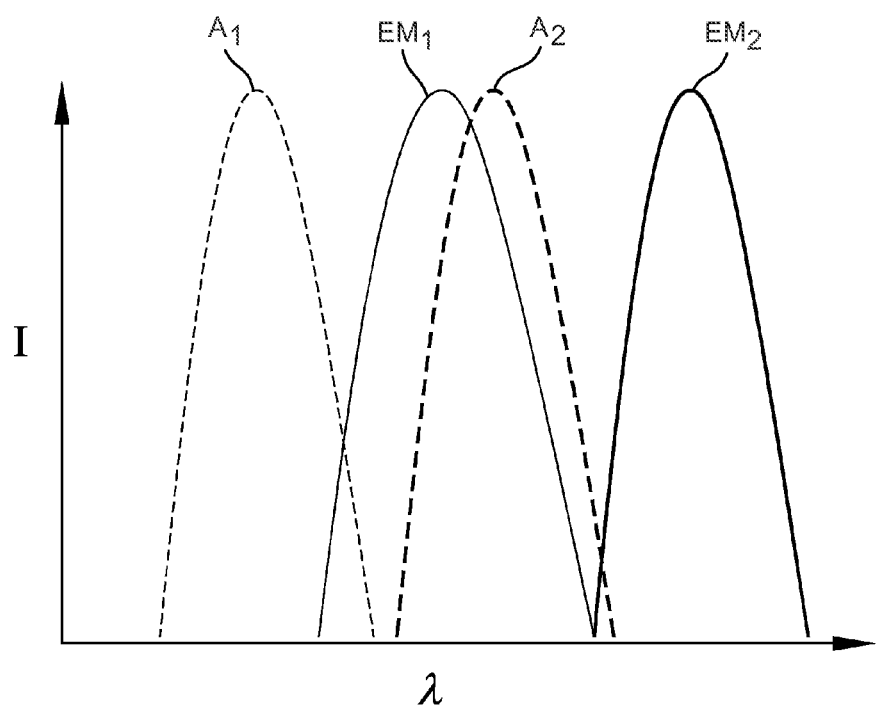

FIG. 3*g* shows in one graph absorptions (excitations) and emission, in a schematically way, of two organic luminescent materials. One or more faster degrading organic luminescent materials are configured to be at least partially excited by light generated by the one or more slower degrading organic luminescent materials during operation of the lighting device. The absorption of the faster degrading organic luminescent material is indicated with reference A1; the absorption of the slower degrading organic luminescent material is indicated with reference A2; the emission of faster degrading organic luminescent material is indicated with reference EM1, which overlaps with A2; and the emission of slower degrading organic luminescent material is indicated with reference EM2. Here the slower degrading luminescent material (especially its absorption A2) is radiationally coupled to the faster degrading organic luminescent material (as it absorbs the emission EM1 from the faster degrading organic luminescent material).

FIGS. 4*a*-4*b* depict experimental support. FIG. 4*a* shows the color point of a blue LED and a combination of F305 red, F240 orange and F083 yellow, according to one of the embodiments as shown in FIGS. 3*a*-3*f*. Reference a refers to 8 layers of such mixture (i.e. each of those 8 layers comprises an identical mixture of these three luminescent materials); reference b refers to 7 layers of such mixture; reference c to 6 layers of this mixture, reference d to 5 layers of such mixture and reference e to 4 layers of this mixture. This is a simulation of bleaching (all organic luminescent materials degrade at the same rate), because each time a layer is removed. The color point perfectly shifts over the BBL and thus stays white. FIG. 4*b* depicts the results of the color point shift of a blue LED and a combination with YAG:Ce and further with: organic red (curve A), organic yellow (low amount) and organic red (curve B), and organic yellow (high amount) and organic red (curve C). The degradation rate of the yellow organic luminescent material was assumed to be 10× faster than the degradation of the organic red luminescent material. Using only F305 (curve A), the red component, only about 15% degradation is allowed before a position of the color point too far from the BBL is obtained. However, in the latter two cases (curves B and C, according to the invention), a 45% degradation is possible, before arriving at a color point too much off-white. This may result in a lifetime increase of about 3×. These are examples of yet non-optimized systems. Hence, larger lifetime increase may well be possible with the herein claimed technology.

FIGS. 5*a*-5*b* depict further experimental support. FIG. 5*a* depicts the change of the color point of a blue LED and a combination of an organic red (Lumogen F305) and an organic green/yellow phosphor (Lumogen 850), according to one of the embodiments of FIG. 3*a*-3*f*. The organic green/yellow phosphor in unprotected condition has a higher degradation rate compared to the organic red phosphor in unprotected condition. The effect of configuring the layer 130 in which the organic green/yellow phosphor is positioned on the life-time of the LED device is shown by means of simulations. In these simulations, the degradation rate of the green/yellow organic luminescent material ($DR_1$) relative to the degradation rate of the organic red luminescent material ($DR_2$) was varied: $DR_1=4*DR_2$ (curve A), $DR_1=2*DR_2$ (curve B), $DR_1=DR_2$ (curve C) and $DR_1=(\frac{1}{2})*DR_2$ (curve D). The degradation rate of the green/yellow luminescent material can be decreased relative to the red organic luminescent material by one or a combination of the embodiments that are discussed, for example use of an oxygen barrier and/or a different matrix material for the green/yellow organic luminescent material. Alternatively, for a configuration as shown in FIG. 3*d*, the first layer thickness L1 can be increased and/or the concentration of the faster degrading organic luminescent material 720 in the first layer 1020 can be increased. At a relatively high degradation rate of the green/yellow organic luminescent material (Curve A), the color point changes relatively fast over time towards a more pink colour. At decreasing degradation rate (moving from curve A, to B, further to C), the shift from the color point away from the BBL becomes relatively more slow and the time interval before a position of the color point too far from the BBL is obtained increases, i.e. the life-time of the LED device increases. Curve D refers to the situation in which full conversion of at least a part of the excitation light of the blue LED by the green/yellow organic luminescent material occurs (see also FIG. 3*e* and corresponding description), resulting in a color point that shifts along the BBL and stays white for a relatively long period of time. FIG. 5*b* further depicts (dashed line) the effect of decreasing the degradation rate of the green/yellow organic luminescent material ($DR_1$) relative to the degradation rate of the organic red luminescent material ($DR_2$), i.e. increasing the value of $DR_2/DR_1$, on the life time of the lighting device. On the y-axis, LF refers to relative value of the life-time, i.e. the time period before a position of the color point too far from the BBL is obtained, of the LED device. On the x-axis, OD refers to the optical density (OD=−LOG (T), wherein T refers to the transmission) and OD is a measurement for the concentration of the green/yellow organic luminescent material, for example in an embodiment according to FIG. 3*d*, by increasing the concentration of the faster degrading organic luminescent material 720 in the first layer 1020. For a value of 0.1 for OD, a relative value for the LF equal to 1 is set. At increasing value of OD, the life time of the LED device increases, and the life-time of the LED device is increased by factor of 10 (LF=10) at a value of 1.2 for OD. The increase in life-time can be explained by the fact that when increasing the value of OD, the degradation of the green/yellow luminescent material is compensated increasingly, and for a certain value of OD the situation is reached in which full conversion of at least a part of the excitation light by the green/yellow organic luminescent material occurs (see also FIG. 3*e* and corresponding description), resulting in a color point that shifts along the BBL and stays white for a relatively long period of time. Experimental values, indicated by the symbols (● and ☐) are in line with the simulations (dashed line).

The invention claimed is:

1. A lighting device comprising a light source and luminescent materials, the luminescent materials comprising a first organic luminescent material and a second organic luminescent material, wherein the light source together with the luminescent materials is configured to generate white lighting device light during operation, wherein the first organic luminescent material degrades with time at a first degradation rate, wherein the second organic luminescent material degrades with time at a second degradation rate, wherein the first degradation rate is larger than the second degradation rate, characterized in that the first organic luminescent material is configured in a first layer, that the second organic luminescent material is configured in a second layer, and that the first layer and/or the second layer is further configured to at least partly compensate for the difference in the first degradation rate and the second degradation rate in order to maintain the lighting device light substantially white during operation time of the lighting device and wherein the first layer is enclosed by an oxygen barrier.

2. The lighting device according to claim 1, wherein the lighting device light maintains to be within 15 SDCM (standard deviation of colour matching) from the BBL (black body locus) during operation time of the lighting device.

3. The lighting device according to claim 1, wherein the luminescent materials are configured to maintain the lighting device light white during at least 5,000 h operation time of the lighting device.

4. The lighting device according to claim 1, wherein the luminescent materials are configured to maintain the lighting device light white during at least 20,000 h operation time of the lighting device.

5. The lighting device according to claim 1, wherein the first layer comprises a first host material in which the first organic luminescent material is embedded, and wherein the second layer comprises a second host material in which the second organic luminescent material is embedded.

6. The lighting device according to claim 1, wherein the first organic luminescent material is configured to be exposed to a lower light source light intensity than the second organic luminescent material.

7. The lighting device according to claim 1, wherein the first layer has a first layer thickness between an upstream face and a downstream face of the first layer, the second layer has a second layer thickness between an upstream face and a downstream face of the second layer, the first layer thickness being larger than the second layer thickness.

8. The lighting device according to claim 1, wherein the first layer has a first layer thickness between an upstream face and a downstream face of the first layer, wherein the first organic luminescent material in said first layer is excitable by excitation light selected from the group consisting of light source light and light generated by the second organic luminescent material, wherein during operation of the lighting device the excitation light is travelling in a direction from the upstream face to the downstream face, and wherein the first layer thickness is selected to impose that for at least part of the wavelength range of the excitation light all light of said wavelength range part is absorbed by the first organic luminescent material before reaching the downstream face.

9. The lighting device according to claim 8, wherein the second layer has a second layer thickness between an upstream face and a downstream face of the second layer, wherein the second organic luminescent material in said second layer is excitable by excitation light selected from the group consisting of light source light and light generated by the first organic luminescent material, wherein during operation of the lighting device the excitation light is travelling in a direction from the upstream face to the downstream face, and wherein the second layer thickness is selected to impose that for at least part of the wavelength range of the excitation light only part of the light of said wavelength range part is absorbed by the second organic luminescent materials when reaching the downstream face.

10. The lighting device according to claim 1, wherein the luminescent materials further comprise an inorganic luminescent material, and wherein the first organic luminescent material emits during operation in a first predetermined wavelength range, wherein the inorganic luminescent material degrades slower than the first organic luminescent material, and wherein the inorganic luminescent material emits during operation in a second predetermined wavelength range which at least partially overlaps with the first predetermined wavelength range.

11. The lighting device according to claim 1, wherein the first organic luminescent material is configured to be at least partially excited by light generated by the second organic luminescent material during operation of the lighting device.

12. The lighting device according to claim 1, wherein the first organic luminescent material is configured in the first layer at a first concentration, and wherein the second organic luminescent material is configured in the second layer at a second concentration, the first concentration being higher than the second concentration.

13. The lighting device according to claim 1, comprising at least three organic luminescent materials.

14. The lighting device according to claim 1, wherein the light source comprises a blue emitting light emitting device.

* * * * *